(12) United States Patent
Weaver et al.

(10) Patent No.: US 12,480,653 B2
(45) Date of Patent: Nov. 25, 2025

(54) ULTRA-LOW NOX MULTI-PORT BURNER APPARATUS

(71) Applicant: Honeywell International Inc., Charlotte, NC (US)

(72) Inventors: Joshua J. Weaver, Yorktown, IN (US); Curtis Taylor, Paradise Valley, AZ (US); Christopher S. Eldridge, Muncie, IN (US)

(73) Assignee: Honeywell International Inc., Charlotte, NC (US)

( * ) Notice: Subject to any disclaimer, the term of this patent is extended or adjusted under 35 U.S.C. 154(b) by 949 days.

(21) Appl. No.: 17/677,618

(22) Filed: Feb. 22, 2022

(65) Prior Publication Data

US 2023/0266003 A1    Aug. 24, 2023

(51) Int. Cl.
*F23D 14/02*    (2006.01)
*F23D 14/62*    (2006.01)

(52) U.S. Cl.
CPC ............ *F23D 14/02* (2013.01); *F23D 14/62* (2013.01); *F23D 2900/14021* (2013.01)

(58) Field of Classification Search
CPC .......... F23D 14/62; F23D 14/08; F23D 14/36; F23D 14/02
See application file for complete search history.

(56) References Cited

U.S. PATENT DOCUMENTS

| | | | | |
|---|---|---|---|---|
| 2,369,236 A | * | 2/1945 | Jaros | F23D 14/08 431/179 |
| 4,610,625 A | * | 9/1986 | Bunn | F23Q 3/008 431/351 |
| 4,872,833 A | * | 10/1989 | Kramer | B01F 25/3121 431/354 |
| 7,785,100 B1 | * | 8/2010 | Swanson | F23D 17/002 431/278 |
| 9,188,330 B1 | * | 11/2015 | Swanson | F23C 7/002 |
| 9,188,339 B2 | | 11/2015 | Headland | |

(Continued)

FOREIGN PATENT DOCUMENTS

| CN | 106895407 A | * | 6/2017 |
|---|---|---|---|
| CN | 111810951 A | | 10/2020 |

(Continued)

OTHER PUBLICATIONS

European Patent Application No. 23154932.0, Extended Search Report, Jul. 19, 2023.

(Continued)

*Primary Examiner* — Jorge A Pereiro
(74) *Attorney, Agent, or Firm* — KPPB Law; Kermit D. Lopez; Luis M. Ortiz

(57) ABSTRACT

A burner apparatus and method of operating the burner apparatus include a burner housing, and a group of fuel and air swirlers maintained by the burner housing, with the group of fuel and air swirlers supplied by a common fuel and air source. The fuel and air can be directed to one or more of the fuel and air swirlers at a time. Each fuel and air swirler among the group of fuel and air swirlers can mix the fuel and the air, resulting in a combustible mixture of the fuel and the (Continued)

air downstream of the group of fuel and air swirlers. The burner apparatus be implemented as a low NOx multi-port burner apparatus.

17 Claims, 3 Drawing Sheets

(56) References Cited

U.S. PATENT DOCUMENTS

| | | | |
|---|---|---|---|
| 9,506,646 B1* | 11/2016 | Swanson | F23C 7/002 |
| 10,584,051 B2 | 3/2020 | D'Agostini et al. | |
| 10,876,731 B2 | 12/2020 | Dolmansley et al. | |
| 10,920,979 B2 | 2/2021 | Zink et al. | |
| 2007/0113555 A1* | 5/2007 | Carroni | F23D 14/62 60/737 |
| 2011/0197587 A1* | 8/2011 | Zuo | F23D 14/02 239/398 |
| 2015/0072294 A1 | 3/2015 | Taylor et al. | |
| 2017/0138267 A1* | 5/2017 | Hughes | F23R 3/14 |
| 2017/0219247 A1* | 8/2017 | Cho | F24H 15/36 |
| 2021/0122550 A1 | 4/2021 | Weaver et al. | |

FOREIGN PATENT DOCUMENTS

| | | |
|---|---|---|
| EP | 0029619 A1 | 6/1981 |
| EP | 2213944 A2 | 8/2010 |
| EP | 2578944 A2 | 4/2013 |
| EP | 3 617 599 A1 | 3/2020 |

OTHER PUBLICATIONS

"Reducing Combustion Emissions in Manufacturing Applications", Honeywell Thermal Solutions (UTS), 2020.

"LO-NOx Burner", Wikipedia, Retrieved from "https://en.wikipedia.org/w/index.php?title=LO-NOx_burner&oldid=1058075240", page last edited on Dec. 1, 2021, at 08:44 (UTC).

"Low NOx Burners", goesheatingsystems.com/low-nox-burners/, downloaded Dec. 21, 2021, Goes Heating Systems, 2019.

A.M. Elbaz and W.L. Roberts, "Air staged double swirl low NOx LPG burner", AFCR 2015 Industrial Combustion Symposium, September 9-11, University of Utah, Utah.

* cited by examiner

ULTRA-LOW NOX MULTI-PORT BURNER APPARATUS

TECHNICAL FIELD

Embodiments are generally related to airfuel gas burners. Embodiments also relate to burners used in industrial heating applications. Embodiments further relate to NOx burners.

BACKGROUND

Industrial manufacturers that use thermal processes are under pressure to reduce combustion byproducts, especially NOx (also referred to herein as NOX or NOx)—a collective term for nitric oxide (NO) and nitrogen dioxide ($NO_2$)—to meet tightening global emissions regulations.

Most of the NOx produced by airfuel burners used in industrial processes comes in the form of thermal NOx. Thermal NOx is strongly correlated to flame temperature and residence time at that temperature. The primary goal of low NOx burner designs is to keep local flame temperatures down. This can be accomplished in a variety of ways with high amounts of excess air, thorough fuel and air mixing, air staging etc.

Low NOx burners are the most cost-efficient way to reduce an industrial heat process's NOx emissions. A large number of low NOx burners have been developed and are currently used in industrial, plant and other applications. Nevertheless, developmental work continues to enhance the design, and improve the performance of existing burners and engineer and develop new and advanced low NOx burners.

In low NOx nozzle mix burners for gaseous fuels emissions turndown is generally much less than thermal turndown. In a business environment of tightening emissions requirements this leads to a restricted operating range if a company intends to stay in compliance. If emissions turndown could be improved for a low NOx burner, this could lead to much greater flexibility in operating ranges, and enhanced control of furnace output.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for an improved low NOx burner apparatus.

It is another aspect of the embodiments to provide for a low NOx multi-port burner apparatus.

It is a further aspect of the embodiments to provide for a method of operating a low NOx multi-port burner apparatus.

It is also an aspect of the embodiments to provide for a burner apparatus with an improved emissions turndown that can lead to much greater flexibility in operating ranges and enhanced control of furnace output.

It is yet a further aspect of the embodiments to provide for a burner apparatus in which multiple low capacity fuel and air swirlers are arranged in an array in which individual or groups of swirlers can be turned on and off based on a required burner capacity.

The aforementioned aspects and other objectives can now be achieved as described herein. In an embodiment, a burner apparatus, can include a burner housing, and a plurality of fuel and air swirlers maintained by the burner housing, wherein the plurality of fuel and air swirlers is supplied by a common fuel and air source, wherein fuel and air are directed to at least one of the plurality of fuel and air swirlers at a time, and wherein each fuel and air swirler among the plurality of fuel and air swirlers mixes the fuel and the air, resulting in a combustible mixture of the fuel and the air downstream of the plurality of fuel and air swirlers. The burner apparatus be implemented as a low NOx multi-port burner apparatus.

In an embodiment of the burner apparatus, the combustible mixture of the fuel and the air exits each fuel and air swirler and can be ignited downstream of the plurality of fuel and air swirlers.

In an embodiment of the burner apparatus, the plurality of fuel and air swirlers can include a plurality of swirler air sleeves.

In an embodiment of the burner apparatus, a combustion air plenum can be provided centrally at a central core within the burner apparatus, wherein the central core of the plurality of swirler air sleeves is located downstream of the combustion air plenum.

In an embodiment of the burner apparatus, the burner housing can comprise an air inlet in which the air in a flow path can enter the burner housing and can be then directed into an outer ring of the plurality of swirler air sleeves.

In an embodiment of the burner apparatus, the burner housing can include a plurality of fuel inlets wherein a first fuel inlet among the plurality of fuel inlets leads to a first fuel vessel and can contain a first path to enter a center core of the plurality of fuel and air swirlers.

In an embodiment of the burner apparatus, a second fuel inlet among the plurality of fuel inlets can lead to a second vessel and can contain a second path to enter an outer ring of the plurality of fuel and air swirlers.

In an embodiment of the burner apparatus, the burner housing can include a plurality of fuel inlets wherein: a first fuel inlet among the plurality of fuel inlets can lead to a first fuel vessel and contains a first path to enter a center core of the plurality of fuel and air swirlers, and a second fuel inlet among the plurality of fuel inlets can lead to a second vessel and contains a second path to enter an outer ring of the plurality of fuel and air swirlers.

In an embodiment of the burner apparatus, the combustible mixture of the fuel and the air can exit the each fuel and air swirler and can be ignited downstream of the plurality of fuel and air swirlers, and the plurality of fuel and air swirlers can include the plurality of swirler air sleeves.

In an embodiment of the burner apparatus, the plurality of fuel and air swirlers can be implemented as an array of fuel and air swirlers.

In an embodiment, a burner apparatus, can comprise: a plurality of fuel and air swirlers, wherein the plurality of fuel and air swirlers is supplied by a common fuel and air source, wherein fuel and air are directed to at least one of the plurality of fuel and air swirlers at a time, and wherein each fuel and air swirler among the plurality of fuel and air swirlers mixes the fuel and the air, thereby resulting in a combustible mixture of the fuel and the air downstream of the plurality of fuel and air swirlers.

In an embodiment, a method of operating a burner apparatus can involve supplying a plurality of fuel and air swirlers by a common fuel and air source; and directing fuel and air to at least one of the plurality of fuel and air swirlers at a time, wherein each fuel and air swirler among the plurality of fuel and air swirlers mixes the fuel and the air to result in a combustible mixture of the fuel and the air downstream of the plurality of fuel and air swirlers.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

Like reference symbols or reference numerals in the various drawings indicate like elements.

DETAILED DESCRIPTION

Figure 1:
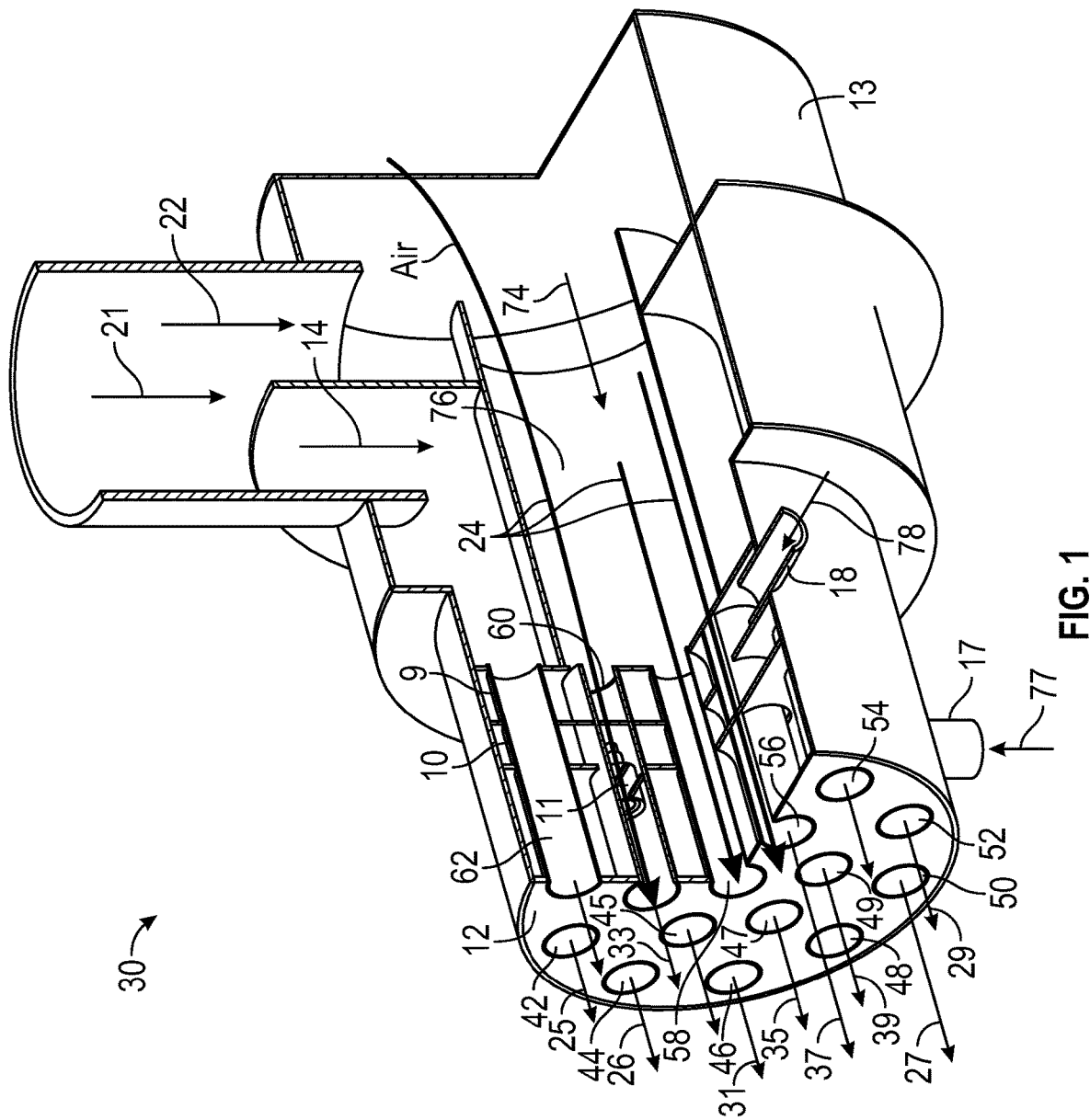
FIG. 1 illustrates a side perspective cut-away view of a burner apparatus, which can be implemented in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment. Similarly, the phrase "in another embodiment" or "in another example embodiment" and variations thereof as utilized herein may or may not necessarily refer to a different embodiment. It is intended, for example, that claimed subject matter may include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The embodiments relate to a burner apparatus and a method of operating the burner apparatus. The burner apparatus can include a burner housing, and a group of fuel and air swirlers maintained by the burner housing, with the group of fuel and air swirlers supplied by a common fuel and air source. The fuel and air can be directed to one or more of the fuel and air swirlers at a time. Each fuel and air swirler among the group of fuel and air swirlers can mix the fuel and the air, resulting in a combustible mixture of the fuel and the air downstream of the group of fuel and air swirlers. The burner apparatus can be implemented as a low NOx multi-port burner apparatus.

Figure 2:
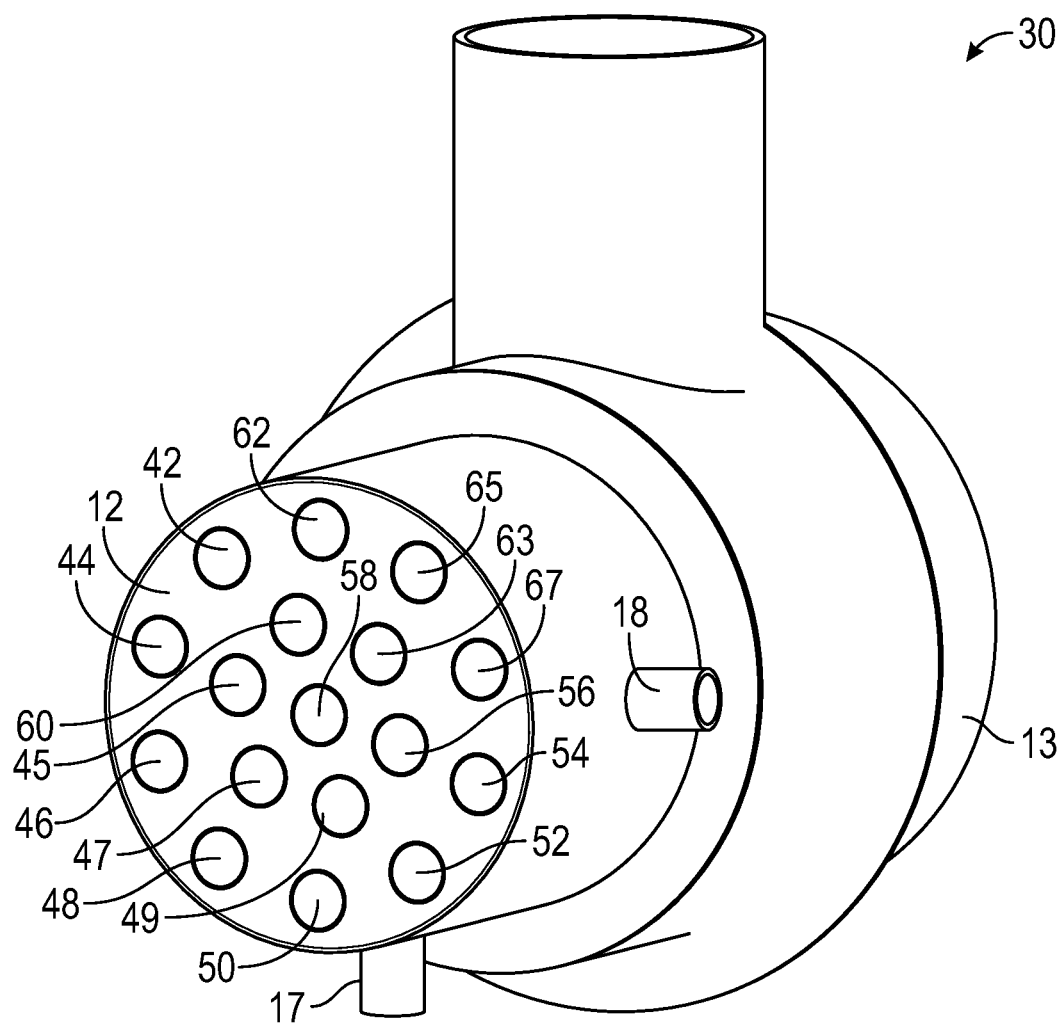
FIG. 2 illustrates a perspective view of the burner apparatus and the burner face shown in FIG. 1 in accordance with an embodiment.

FIG. 1 illustrates a side perspective cut-away view of a burner apparatus 30, which can be implemented in accordance with an embodiment. FIG. 2 illustrates a perspective view of the burner apparatus 30 shown in FIG. 1 in accordance with an embodiment. Note that in FIG. 1 and FIG. 2 identical or similar parts or elements are generally indicated by identical reference numerals.

The burner apparatus 30 can include an air inlet 21 that engages with a burner housing 13, which contains a central combustion air plenum 76. The burner apparatus 30 also includes a plurality of swirler air sleeves 42, 44, 45, 46, 47, 48, 49, 50, 52, 54, 56, 58, 60, 62, 63, 65, 67. The burner apparatus 30 can be implemented as a low NOx multi-port burner apparatus.

Air can enter through the air inlet 21, and is then split into flow paths 22, 74, and 14 (i.e., see arrows 22, 74, 14). The arrows 22, 74 14 respectively indicate the direction of the flow paths 22, 74, 14). The air in the flow paths 21 and 74 can enter a burner central combustion air plenum 76 and can be split into the center core of swirler air sleeves 45, 56, 58, 60, 63, 47, 49. The combustion air plenum 76 is shown as cylindrically-shaped and located centrally within the burner apparatus 30 (and hence, centrally within the burner housing 13).

The air in the flow path 14 can enter the burner housing 13 and can be split into the plurality of swirler air sleeves 42, 44, 46, 48, 50, 52, 54, 62, 65, 67. The fuel enters the fuel inlets 17 and 18. Fuel inlet 17 leads to fuel vessel 10 and has a path to enter the center core of swirlers (highlighted as shown in FIG. 1). Fuel inlet 18 leads to fuel vessel 9 and has a path to enter the outer ring of swirlers (remaining not highlighted). The air and fuel is then mixed in each individual swirler such as, for example, swirler 11. That is, each swirler air sleeve 42, 44, 45, 46, 47, 48, 49, 50, 52, 54, 56, 58, 60, 62, 63, 65, 67 can contain a swirler such as swirler 11. A combustible mixture can then exit each fuel swirler as indicated, for example, by arrows 25, 26, 27, 29, 31, 33, 35, 37, 39, etc., and can be ignited after exiting the burner face 12.

The configuration of the burner apparatus 30 is unique in its application of fuel and air swirlers. By arranging multiple low capacity fuel and air swirlers in an array as shown in FIG. 1 and FIG. 2, individual or groups of swirlers can be turned on and off based on required burner capacity. Turndowns in the range of 40:1 can become possible while still maintaining low NOx.

The burner apparatus 30 includes an array of fuel and air swirlers supplied by a common fuel and air source, whereby the fuel and air can be directed to one or many fuel and air swirlers at a time. The fuel and air swirler can be designed in such a manner so to mix the fuel and air so that a combustible mixture of fuel and air can be located downstream of the swirler.

Figure 3:
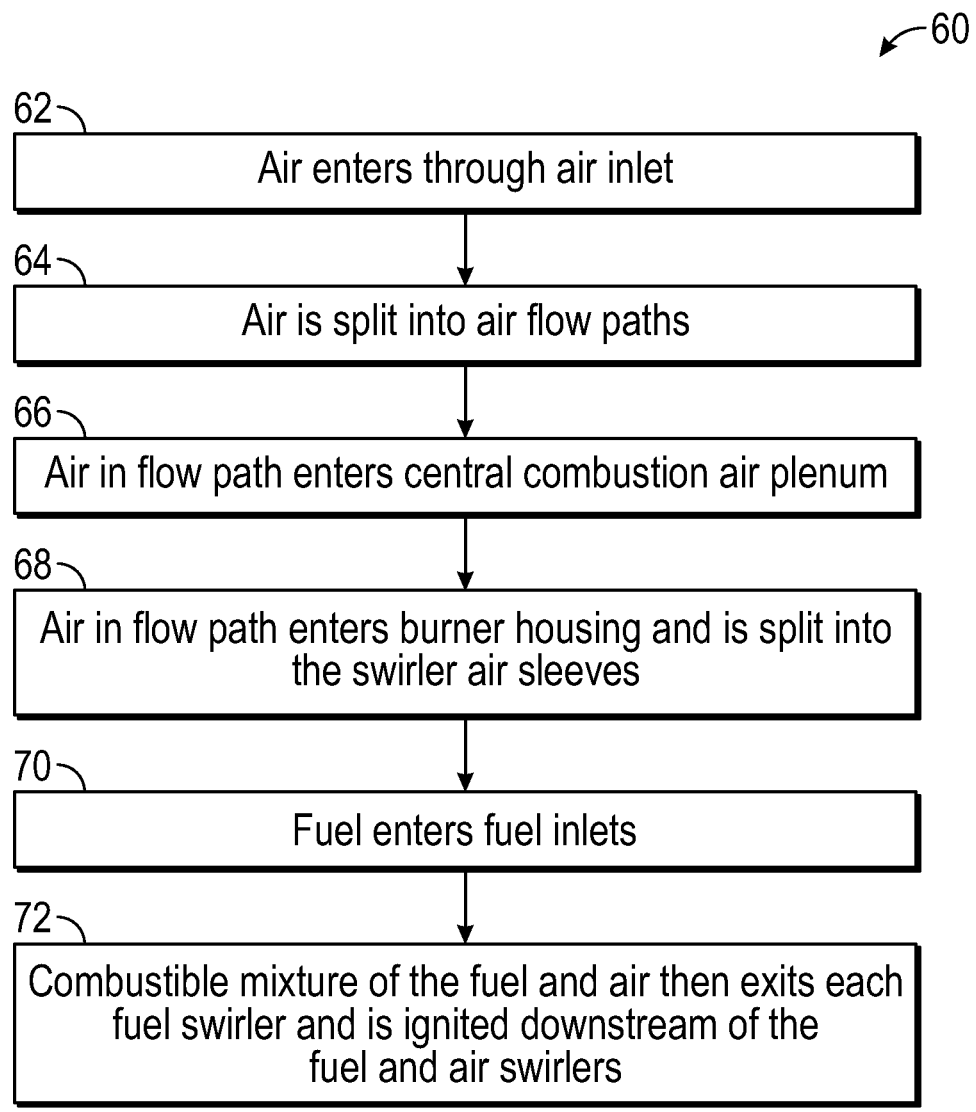
FIG. 3 illustrates a flow chart depicting steps of a method for operating the burner apparatus depicted in FIG. 1 in accordance with an embodiment.

FIG. 3 illustrates a flow chart depicting steps of a method 60 for operating the burner apparatus 30 depicted in FIG. 1, in accordance with an embodiment. It should be appreciated that the sequence of steps and operations of the method 60 shown in FIG. 3 are not limited to the particular sequence depicted in FIG. 3. That is, some steps or operations shown in the blocks in FIG. 3 may be performed in a different sequence or even simultaneously. The specific sequence shown in FIG. 3 is depicted for exemplary purposes only and should not be considered as a limiting feature of the embodiments. Other sequences of operations/steps can be implemented in accordance with other embodiments.

As indicated at block 62, air can enter through the air inlet 21 discussed above with respect to FIG. 1. Then, as shown at block 64, the air is split into the paths 22, 24, and 14 shown in FIG. 1. Thereafter, as illustrated at block 66, the air in the flow path 22, 74 can enter the centrally located combustion air plenum 76 and can be split into the plurality of swirler air sleeves discussed earlier. As indicated previously, the combustion air plenum 76 can be located generally centrally within the burner apparatus 30 and also centrally within the burner housing 13.

A indicated at block 68, the air in flow path 14 can enter the burner housing 13 and can be then split into the plurality of swirler air sleeves described earlier. As shown at block 70, fuel can enter the fuel inlets 17 and 18. Fuel inlet 17 can lead to fuel vessel 10 and has a path to enter the center core of swirlers. Fuel inlet 18 can lead to fuel vessel 9 and has a path to enter the outer ring of swirlers. The air and fuel can be then mixed in each individual swirler. As indicated at block 72, a combustible mixture of the fuel and air can then exit each fuel swirler and can be ignited downstream of the fuel and air swirlers.

In some embodiments, the method 60 shown in FIG. 3 can involve a method of operating the burner apparatus 30 including operational steps or instructions such as: supplying a plurality of fuel and air swirlers by a common fuel and air source; and directing fuel and air to at least one of the plurality of fuel and air swirlers at a time, wherein each fuel and air swirler among the plurality of fuel and air swirlers mixes the fuel and the air to result in a combustible mixture of the fuel and the air downstream of the plurality of fuel and air swirlers. As discussed previously, the combustible mixture of the fuel and the air can exit the each fuel and air swirler and can be ignited downstream of the fuel and air swirlers. Furthermore, the plurality of fuel and air swirlers can include a plurality of swirler air sleeves. In addition, the combustion air plenum discussed previously can be split into the plurality of swirler air sleeves. The plurality of fuel and air swirlers can further include the previously discussed air inlet in which the air in a flow path can enter the burner housing and can be split into the plurality of swirler air sleeves.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A burner apparatus, comprising:
a burner housing; and
a plurality of fuel and air swirlers maintained by the burner housing, wherein the plurality of fuel and air swirlers is supplied by a common fuel and air source, wherein fuel and air are directed to at least one of the plurality of fuel and air swirlers at a time, and wherein each fuel and air swirler among the plurality of fuel and air swirlers mixes the fuel and the air, resulting in a combustible mixture of the fuel and the air downstream of the plurality of fuel and air swirlers, wherein the burner housing comprises a plurality of fuel inlets wherein a first fuel inlet among the plurality of fuel inlets leads to a first fuel vessel and contains a first path to enter a center core of the plurality of fuel and air swirlers, and wherein a second fuel inlet among the plurality of fuel inlets leads to a second vessel and contains a second path to enter an outer ring of the plurality of fuel and air swirlers.

2. The burner apparatus of claim 1, wherein the combustible mixture of the fuel and the air exits the each fuel and air swirler and is ignited downstream of the each fuel and air swirler.

3. The burner apparatus of claim 1 wherein the plurality of fuel and air swirlers includes a plurality of swirler air sleeves.

4. The burner apparatus of claim 3 further comprising a combustion air plenum, wherein the combustion air plenum is split into the plurality of swirler air sleeves.

5. The burner apparatus of claim 3 wherein the the air in a flow path enters the burner housing and is split into the plurality of swirler air sleeves.

6. The burner apparatus of claim 1 wherein the burner housing comprises a plurality of fuel inlets wherein:
a first fuel inlet among the plurality of fuel inlets leads to a first fuel vessel and contains a first path to enter a center core of the plurality of fuel and air swirlers; and
a second fuel inlet among the plurality of fuel inlets leads to a second vessel and contains a second path to enter an out ring of the plurality of fuel and air swirlers.

7. The burner apparatus of claim 1, wherein:
the combustible mixture of the fuel and the air exits the each fuel and air swirler and is ignited downstream of the each fuel and air swirler;
the plurality of fuel and air swirlers includes a plurality of swirler air sleeves.

8. A burner apparatus, comprising:
a plurality of fuel and air swirlers, wherein the plurality of fuel and air swirlers is supplied by a common fuel and air source, wherein fuel and air are directed to at least one of the plurality of fuel and air swirlers at a time, and wherein each fuel and air swirler among the plurality of fuel and air swirlers mixes the fuel and the air, thereby resulting in a combustible mixture of the fuel and the air downstream of the plurality of fuel and air swirlers;
a plurality of fuel inlets wherein:
a first fuel inlet among the plurality of fuel inlets leads to a first fuel vessel and contains a first path to enter a center core of the plurality of fuel and air swirlers; and
a second fuel inlet among the plurality of fuel inlets leads to a second vessel and contains a second path to enter an outer ring of the plurality of fuel and air swirlers.

9. The burner apparatus of claim 8, wherein the combustible mixture of the fuel and the air exits each fuel and air swirler and is ignited downstream of the each fuel and air swirler.

10. The burner apparatus of claim 8 wherein the plurality of fuel and air swirlers includes a plurality of swirler air sleeves.

11. The burner apparatus of claim 10 further comprising a combustion air plenum, wherein the combustion air plenum is split into the plurality of swirler air sleeves.

12. The burner apparatus of claim 11 wherein the air in a flow path enters and is split into the plurality of swirler air sleeves.

13. A method of operating a burner apparatus, comprising:
supplying air to a plurality of fuel and air swirlers by a common air source through an air inlet, wherein the air inlet is split a plurality of flow paths,
supplying a plurality of fuel and air swirlers by a common fuel source via a plurality of fuel inlets, wherein the plurality of fuel and air swirlers comprises a center core of the plurality of fuel and air swirlers and an outer ring of the plurality of fuel and air swirlers;
wherein a first fuel inlet of the plurality of fuel inlets leads to a first fuel vessel and contains a first path to the center core of the plurality of fuel and air swirlers; and
wherein a second fuel inlet of the plurality of fuel inlets leads to a second fuel vessel and contains a second path to the outer ring of the plurality of fuel and air swirlers,
directing fuel and air to at least one of the plurality of fuel and air swirlers at a time, wherein each fuel and air swirler among the plurality of fuel and air swirlers mixes the fuel and the air to result in a combustible mixture of the fuel and the air downstream of the plurality of fuel and air swirlers.

14. The method of claim 13, wherein the combustible mixture of the fuel and the air exits the each fuel and air swirler and is ignited downstream of the each fuel and air swirler.

15. The method of claim 13, wherein the plurality of fuel and air swirlers includes a plurality of swirler air sleeves.

16. The method of claim 15, wherein a combustion air plenum is split into the plurality of swirler air sleeves.

17. The method of claim 15 wherein the air in a flow path enters the burner housing and is split into the plurality of swirler air sleeves.

* * * * *